Dec. 9, 1930.  L. AVORIO  1,784,774
ELASTICALLY DEFORMABLE PARACHUTE
Filed Jan. 3, 1928  2 Sheets-Sheet 1
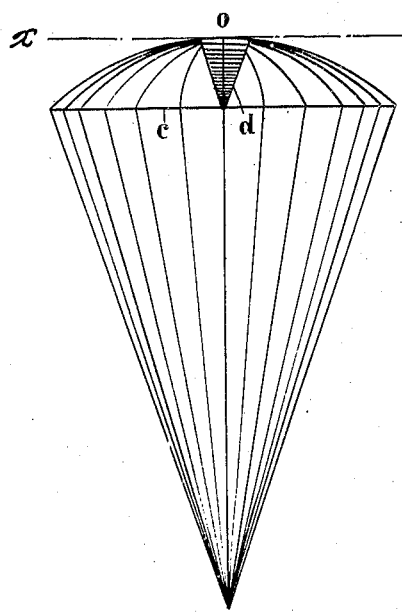
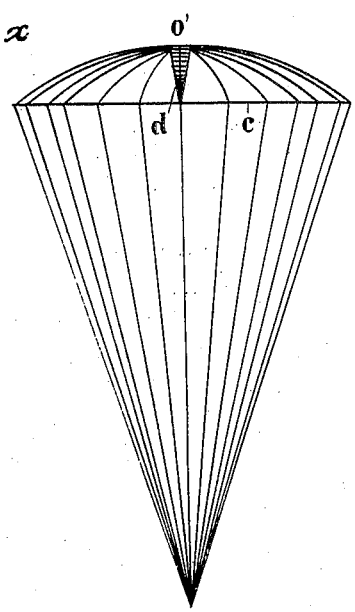
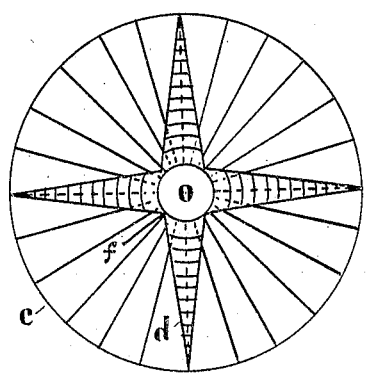
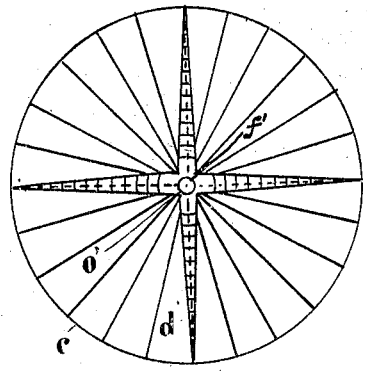
INVENTOR
Luigi Avorio
BY
ATTORNEY Dec. 9, 1930.  L. AVORIO  1,784,774
ELASTICALLY DEFORMABLE PARACHUTE
Filed Jan. 3, 1928  2 Sheets-Sheet 2

INVENTOR
Luigi Avorio
BY
ATTORNEY

UNITED STATES PATENT OFFICE

LUIGI AVORIO, OF ROME, ITALY

ELASTICALLY-DEFORMABLE PARACHUTE

Application filed January 3, 1928, Serial No. 244,293, and in Italy August 5, 1927.

As a result of the continually increasing speed of aeroplanes, parachutes, which generally open out in the wake of the propeller, are subjected to increasing stresses. It is therefore necessary to strengthen the parachute correspondingly by increasing the strength both of the fabric and of the seams, suspensions and the like which however entails an excessive increase in weight and renders the device cumbersome and thus greatly diminishes its practical value.

In certain types of parachutes attempts have been made to improve the working conditions by providing one or more elastically deformable sleeves, designed to absorb the violence of the initial shock. Such sleeves usually consist of the same material as the remainder of the parachute, and are open-ended and cylindrical in shape, one end being sewn to the parachute to coincide with an opening therein of equivalent size and the other end being encircled by an elastic cord. Such sleeve is adapted to come into operation shortly after the parachute has spread in descending, i. e., when the same is completely filled with air and to open to its maximum extent to allow the escape of the excess air and thus diminish the pressure of the parachute, whereas during the normal course of descent, the elastic constraint on the sleeve is adapted to reduce the diameter of said sleeve to normal dimensions in order to insure a slow drop.

In other types of parachutes the sleeve has been dispensed with and the elastic cord is applied directly to the vent in the cap and is normally restricted by a rubber and enclosed in the hem of the vent. In this proposal, however, the only elastically resisting element is the rubber cord encircling the vent and the stretching of the fullness of the material of the cap does not absorb any appreciable energy. Since the material of which parachutes are made is necessarily always light, its strength and therefore the pressure which it can safely withstand is limited, so that the speed of the aeroplane must also be limited, while the parachute is being launched, in order to avoid pressures capable of disrupting the material of the parachute.

The object of the present invention is to provide a parachute which, although consisting of the usual light material of limited strength, may nevertheless be launched, without fear of disruption or tearing, even from aeroplanes travelling at maximum speed.

In the parachute of the present invention, the whole cap is elastically deformable, which means that its spreading must necessarily be contemporaneous with the elastic deformation, and therefore contemporaneous with the escape of the excess of air.

To this end according to the present invention, in a parachute having a vent normally elastically constrained by a rubber cord enclosed in the hem thereof, the cap is provided with elastic means conveniently distributed over its surface and adapted to secure the stretching and shrinking of the material in accordance with the variations in the air pressure encountered thereby.

Moreover, as the cap of the parachute has a considerably larger area than the small sleeve above mentioned, the pressure required in order to produce the same tension in the material of the parachute as that which extends the elastic cord in the sleeve, is considerably lower and the parachute is consequently subjected to much less stresses.

In the accompanying drawing which serves to illustrate the present invention:

Figs. 1 and 2 show an elevation and a top view, respectively, of one embodiment of the parachute when fully distended.

Figures 3 and 4 are corresponding views of the same parachute during the normal course of the descent.

The elastically deformable parachute illustrated in Figures 1 to 4 comprises a cap (c) provided at the top with a circular aperture or vent (o) lying in a plane (xx) normal to the base and of sufficient diameter to permit of the escape, during the opening of the cap, of the excess air due to the maximum speed of the aeroplane. Around the periphery of the aperture or vent (*o*) are applied one or more elastic cords or ribbons, of such length and elasticity that when they are completely stretched, as when the parachute is opening, Figs. 1 and 2, then coincide with the development of the periphery of the maximum aperture (*f*), while when they are loose, as during the descent. Figs. 3 and 4, they coincide with the periphery of aperture (*f'*) of the smallest area, compatible with the stability of the parachute.

That is to say, after the escape of the excess air from the cap, the pressure in the latter and therefore the tension of the material decreases, and the aperture (*o*) Figs. 1 and 2, returns automatically to the dimensions of aperture (*o'*) Fig. 2; in which the cap looses its geometric distended shape to assume a shrunken shape.

For the purpose of subjecting the material of the parachute to the least possible stress and of further diminishing the speed of the descent, the present invention provides an arrangement for obtaining a practically always instantaneous spreading by means of gradual and equally distributed efforts.

To this end the parachute has, besides the dilation of the vent (*o*), also the stretching out of the folds of material (*d*) rendered elastic, by means of cords, ribbons or the like on tightening of the aperture (*o*). The material of the parachute becomes shrunk in regular folds owing to the action of elastic cords (*d*). In the act of opening, Figs. 1 and 2, these folds become extended gradually as the elastic of the gores extend, thus producing the gradual widening of the aperture (*o'*); a gradual and uniform opening of all its parts is thus obtained, and the stresses are consequently also gradual and uniformly distributed.

Figure 5:
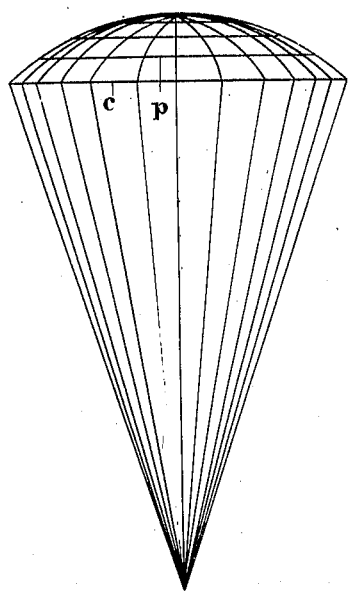
Figures 5, 6, 7, 8 are corresponding views of a second embodiment of the parachute.
Figure 7:
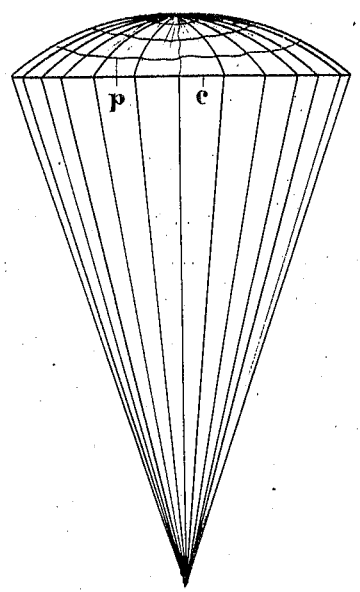
Figure 6:
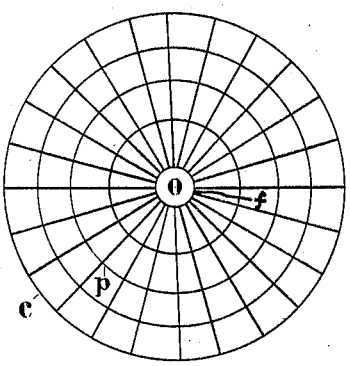
Figure 8:
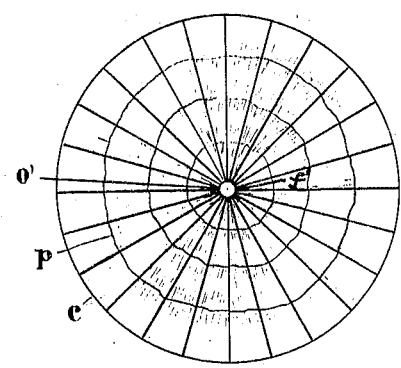

In the embodiment shown in Figs. 5 to 8, the elastic, ribbons, cords, tubes or the like instead of being limited to the parallels comprised within the gores, extend over all the circumference of parallels (*p*) of the cap and preferably in correspondence with the seams which are thus strengthened; the material, which in Figs. 3 and 4 is all shrunk within the gores (*d*), in Figs. 7 and 8 is shown, on the contrary, evenly distributed and stretched to the full development of parallels (*p*), while in the act of the opening it extends completely as seen in Figs. 5 and 6.

It is evident that also in this case graduation and uniformity are obtained not only of the opening but also of the stresses on the cap.

In both of the embodiments illustrated in Figs. 1 to 8 the possibility is also secured of facilitating the expulsion of excess air without, however, increasing the dimensions of the aperture (*o*), or of maintaining it unchanged while diminishing the dimensions of said aperture (*o*). This possibility is secured, as shown in Figs. 9 and 10, by the use of auxiliary openings distributed over the cap, irrespective as to whether the elastics be limited to the gores (*d*), Figs. 1 to 4, or whether they extend to the entire circumference from the parallels, as illustrated in Figs. 5 to 8.

Figure 9:
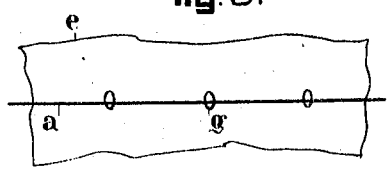
Figures 9 and 10 represent a portion of the material of the cap of the parachute.
Figure 10:
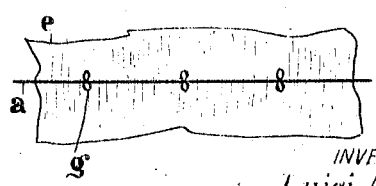

Figs. 9 to 10 show a piece (*e*) of material of the parachute traversed by an elastic cord (*a*); in correspondence with said elastic cord small openings (*g*) are provided in the material, at convenient intervals. It is evident that if the elastic cord (*a*) be stretched, as during the opening of the parachute, the borders of the openings (*g*) will be drawn apart as shown in Figure 9, whereas, if the elastic is slack, as during the descent, the said borders will be drawn together, so as to almost close the openings. In other words these openings with respect to the expulsion of air act similarly to the central aperture (*o*) and come into operation simultaneously therewith.

Claims:

1. In parachutes of the class comprising a cap with holes elastically constrained so as to produce the variation of their size, the combination, with a cap having holes of elastically variable size, of elastic means suitably distributed over the surface of the cap and adapted to secure the stretching and the shrinking of the cap itself in accordance with the variations of the air pressure encountered thereby.

2. A parachute as set forth in claim 1 with an elastically constrained vent at the top of the cap and in which the elastic means for the distension of the cap and securing together the dilation of the vent, consist in elastic gores radiating from the periphery of the vent towards the periphery of the cap.

3. A parachute as set forth in claim 1, with an elastically constrained vent at the top of the cap and in which the elastic means for the distension of the cap and securing together the dilation of the vent consist of elastic cords, or the like, one of which is enclosed in the hem of the vent and the others are disposed in parallel concentric relation with the hem of the vent and the border of the cap.

4. A parachute as set forth in claim 1, in which the elastic means for the distension of the cap and for securing the dilation of the holes of variable size, consist of elastic cords, or the like, disposed in parallel concentric relation with the vent and the border of the cap, and the fabric of the cap being provided with holes, which are closed or opened by means of the tension of the aforesaid elastic cords, or the like, which serve for the deformation of the cap.

In testimony whereof I have affixed my signature this 14th day of December, 1927.

LUIGI AVORIO.